(12) United States Patent
Gram

(10) Patent No.: US 7,608,212 B2
(45) Date of Patent: *Oct. 27, 2009

(54) METHOD FOR THE PRODUCTION OF A MOLDED PART

(76) Inventor: Jes Tougaard Gram, 10625 Pinnacle Peak Rd., Scottsdale, AZ (US) 85255

(*) Notice: Subject to any disclaimer, the term of this patent is extended or adjusted under 35 U.S.C. 154(b) by 0 days.

This patent is subject to a terminal disclaimer.

(21) Appl. No.: 11/641,515

(22) Filed: Dec. 19, 2006

(65) Prior Publication Data

US 2007/0096361 A1    May 3, 2007

Related U.S. Application Data

(63) Continuation of application No. 09/979,687, filed as application No. PCT/DK00/00261 on May 15, 2000, now Pat. No. 7,150,845.

(30) Foreign Application Priority Data

May 17, 1999    (DK) ............................... 1999 00670

(51) Int. Cl.
*B29C 45/14*    (2006.01)
(52) U.S. Cl. .................. 264/254; 264/255; 264/275; 264/297.6; 264/297.2; 264/297.3; 264/328.8
(58) Field of Classification Search .............. None
See application file for complete search history.

(56) References Cited

U.S. PATENT DOCUMENTS

| 3,224,043 | A | * | 12/1965 | Sieben et al. ............... 425/134 |
| 3,707,591 | A | * | 12/1972 | Chalfant .................... 264/520 |
| 4,243,362 | A | * | 1/1981 | Rees et al. .................. 425/130 |
| 4,444,711 | A | * | 4/1984 | Schad ........................ 264/243 |
| 4,449,913 | A | * | 5/1984 | Krishnakumar et al. ..... 425/548 |
| 4,734,023 | A | * | 3/1988 | Nesch et al. ............... 425/130 |
| 4,836,767 | A | * | 6/1989 | Schad et al. ............... 425/552 |

* cited by examiner

*Primary Examiner*—Edmund H. Lee

(57) ABSTRACT

Procedure and molding tool for the molding of both one- or multi-component parts preferably of plastics, possibly with an integrated insertion of parts of another material as steel and copper, where the turnable middle section during the molding is supplied with material on at least one of the surfaces/areas, that in contrary to the normal procedures are not at a right angle to the closing direction between the stationary mold part and the movable mold part of the tool. This can e.g. be realized by molding a part or a piece of a part and/or by molding around a special part for the in-molding on at least one of these surfaces/areas of the turnable middle section. This molding and/or insertion can take place while the tool is closed and on several surfaces at the same time, which saves cycle time. The tool according to the invention can substitute or supplement a jaw tool because the turnable middle section in connection with the opening and closing of the stationary mold part and the movable mold part makes these serve as an extra set of jaws.

5 Claims, 5 Drawing Sheets

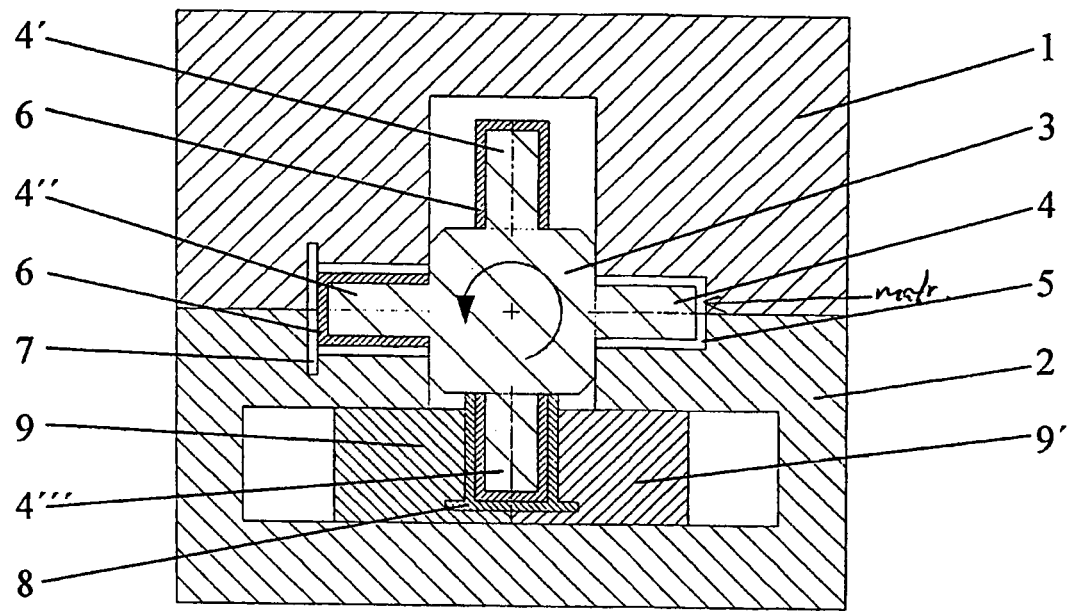
Figur 1
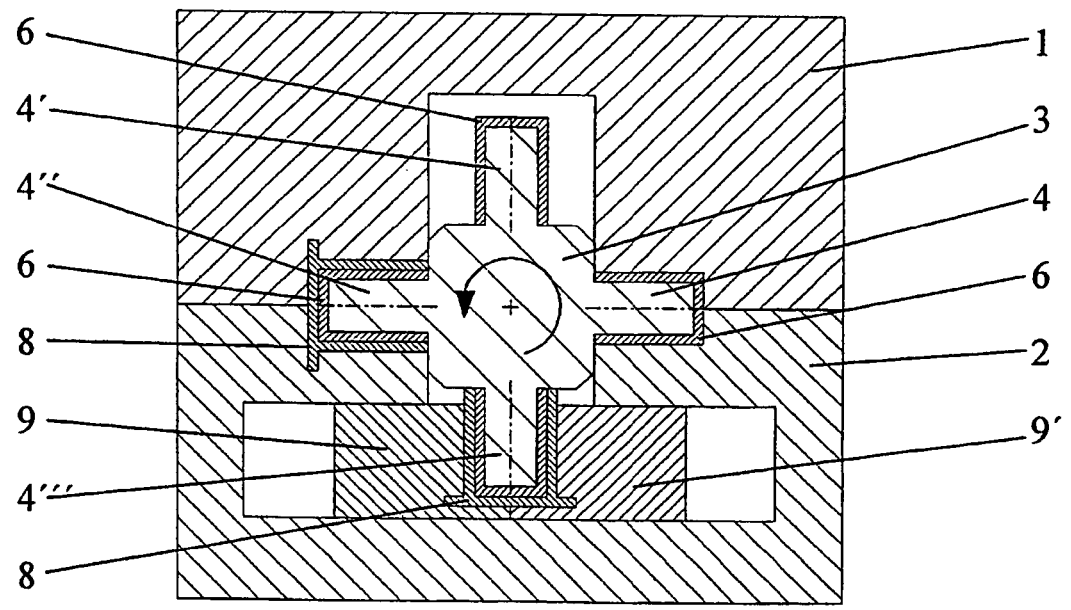
Figur 2

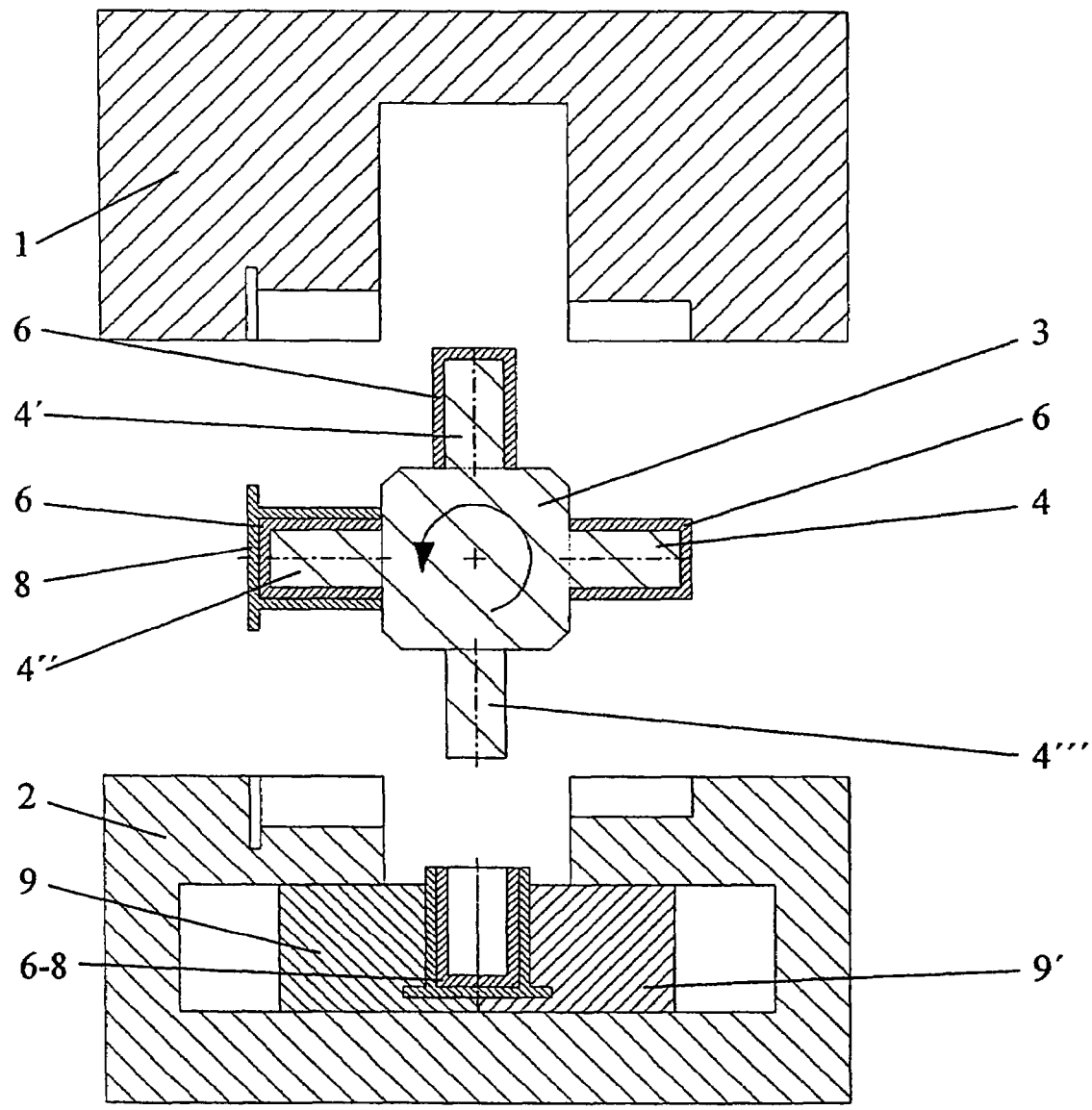
Figur 3

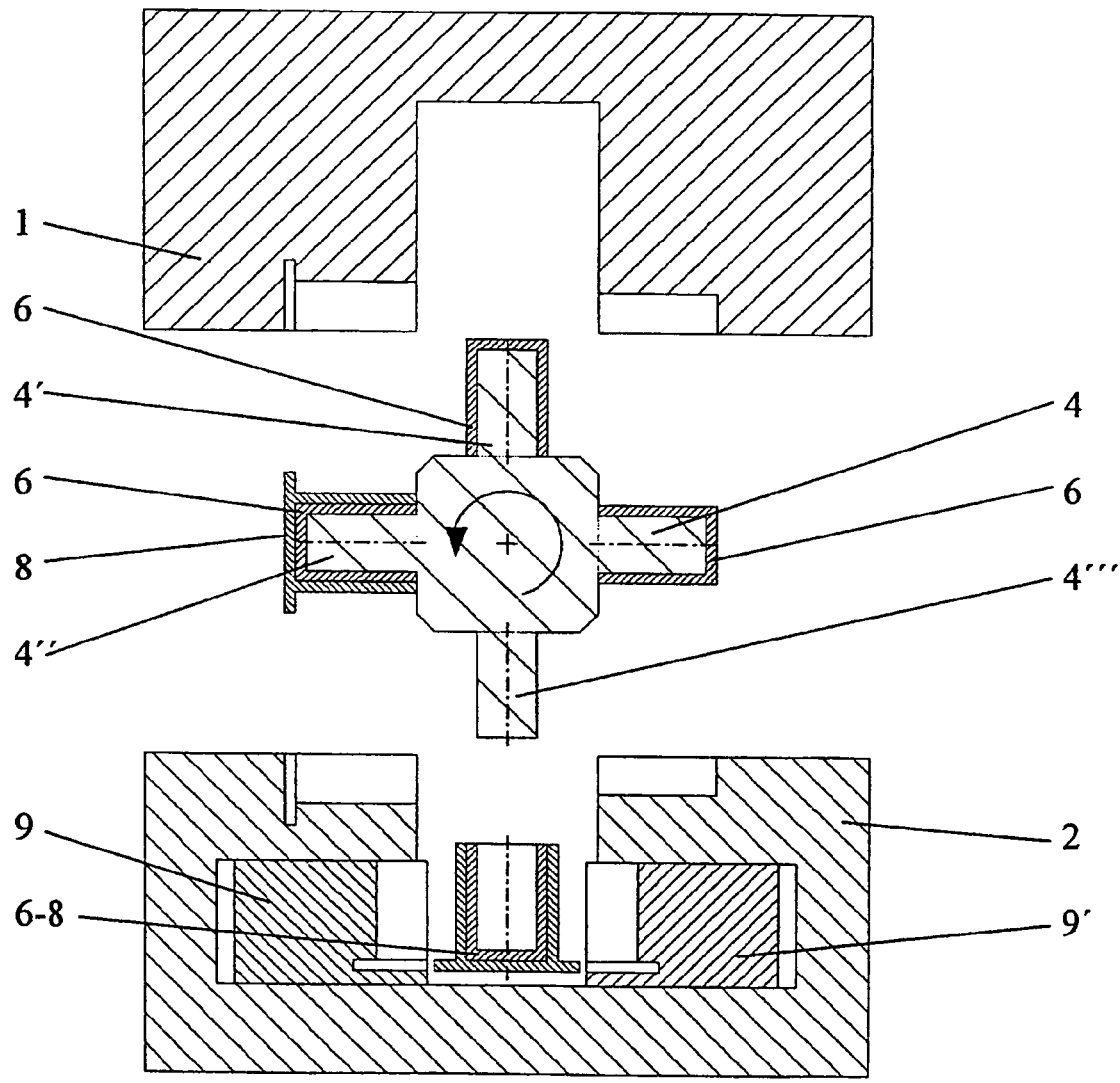
Figur 4

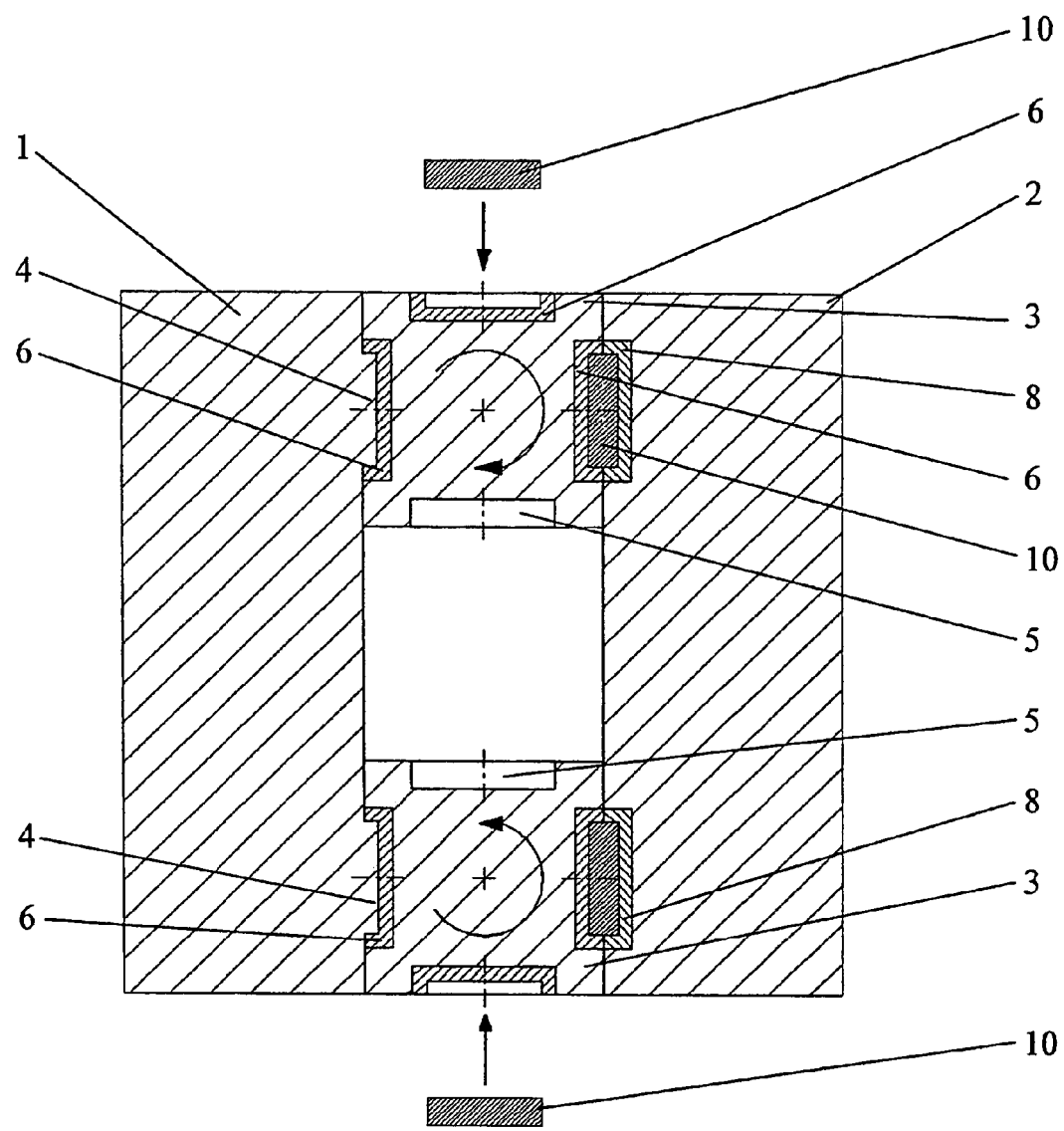
Figur 5

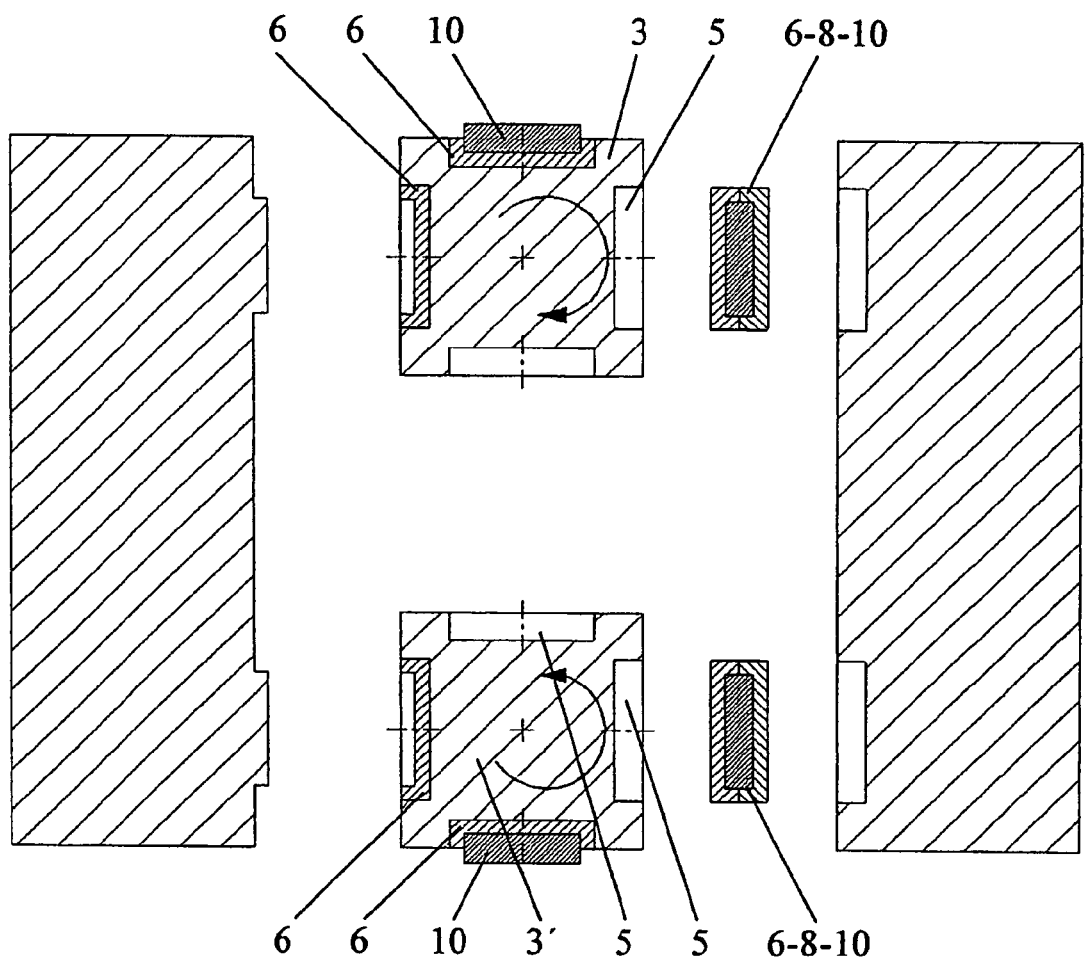
Figur 6

METHOD FOR THE PRODUCTION OF A MOLDED PART

The invention concerns a procedure for the production of parts preferably of plastics, both one-component as well as multi-component, in a tool equipped with at least one turnable middle section, and a machine for the performance of the procedure.

There is known a number of different procedures for injection-molding of plastic parts in a tool or a mold, which is equipped with at least one turnable middle-section. An example of this is e.g. the in my international patent application No. WO 98/35808 described procedure and machinery for the production of two- or multi-component parts of plastics.

The up till now described procedures and machinery for the production of parts like this have various disadvantages or flaws. These are tried to be corrected with the procedure and machinery according to the invention. Hereby are also achieved a number of advantages and simplifications of the hitherto known molding-processes, which considerably will be able to decrease the cycle-time and consequently the price of the finished parts.

The invention is characterized by the fact, that the turnable middle section is supplied with material on/at at least one of the surfaces/areas in the turnable middle section, which is not placed at a right angle of the closing direction of the tool, e.g. by molding a part or a piece of a part, and/or by inserting a special part for the in-molding on at least one of the surfaces/areas of the turnable middle section.

The turnable middle section of the tool preferably has a cross section with the outline of a regular polygon, preferably a square. This square can suitably have the corners cut off so a smaller opening of the mould will be sufficient to turn the middle-section around. For the same reason the middle-section can suitably be parted into two or more turnable mold-parts. Besides the square or an adapted square the cross-section of the turnable middle-section can have the outline of a regular hexagon, an octagon or another preferably regular polygon, where the two opposite placed sides are parallel.

The various uses and advantages of the procedure and machinery according to the invention are specified under the description of the drawing, where FIG. 1 shows a tool according to the invention in its first cycle of four phases seen from above in closed position, FIG. 2 shows the same in a following cycle also seen from above in closed position, FIG. 3 shows the same in open position, where the turning of 90 degrees in the direction of the arrows can take place, FIG. 4 shows the same, where the jaws also are opened, so that the finished combined parts are released, FIG. 5 shows one for the inserting intended tool according to the invention with two turnable middle-sections seen from above in closed position, and FIG. 6 the same in open position.

In FIG. 1 are shown a tool according to the invention for the two-component molding with the stationary mold-part 1, the movable mold part 2 and the turnable middle-section 3. On the turnable middle-section 3 there is on each of the four sides placed a core, which positions in the four phases of the molding respectively are marked as 4, 4', 4" and 4'". In the beginning of the first phase the core 4 is placed at the right and situated in the cavity 5 between the stationary mold part 1 and the movable mold part 2. In the second phase the placing of the core 4' is in the top-position, where there in the mold cavity is molded the inner piece of the part 6. In the third phase, where the core 4" is in a position at the left on the figure, the molded piece of the part 6 is still placed on it. The molded and cooled piece of the part 6 now serves as a part of the mold, namely as the inner parting line of the cavity for the next piece of the part in connection with the outer mold cavity 7. In the fourth and the last phase of the start, there is shown as the core 4'" in its lowest position, is the final molding of the part 8 made in the outer mold cavity 7. In the movable mold part 2 are noticed the two jaw parts 9 and 9', which at their later opening makes the ejection of the then complete molded combined part 6-8 possible, but which here has caught and still is holding this. But as it will be seen from the figure, there is plenty of space for placing e.g. hot-runners, preferably in the stationary mould part 1 as in the ordinary molding tools.

FIG. 2 shows the same tool in closed position in one of the cycles that follows after the first cycle shown on FIG. 1. In the phase to the right on the core 4 there is in the mould cavity molded the innermost placed piece of the parts 6. In the top position this piece of the parts 6 is cooled, so that it in the phase at the left, where the position of the core is 4", can serve as a part of the mould outline for the finished molding of the part 8. In the phase at the lowest point of the figure with the core in position 4'" is seen the finished molded combined part 6-8 ready for ejection by the use of the two built in jaw parts 9 and 9'.

On FIG. 3 is shown the same tool in open position, where the turnable middle section 3 is able to perform its repeated 90 degrees turnings. It concerns the same four phases with the respective placements of the cores 4, 4', 4" and 4'" as in the other figures. It shall be noticed that in the finishing lowest position is the finished molded combined part 6-8 removed from its core 4'" by the use of the two jaws 9 and 9' which is not yet opened. In this way it is avoided to place any ejectors in the middle section 3 and maybe completely avoiding the use of ejectors in the tool. This design is a great simplifying of the construction of the tool, as well as the opening distance and the build-in height in this way can be minimized in relation to tools with traditional ejectors. But in other cases more traditional ejectors can be used to the tools according to the invention.

FIG. 4 shows the same tool in open position where the difference from FIG. 3 is, that the jaws 9 and 9' are opened, so that the final ejection of the finished combined part 6-8 has been able to take place. This can e.g. be realized by, the not on the drawing shown, ejectors placed under the jaws 9 and 9' or by using compressed air.

On the FIG. 5 is from above shown another solution of the invention, namely where the tool according to the invention is used for the insertion of e.g. metal parts. In the closed tool consisting of the stationary mold part 1 and the movable mold part 2 is shown the two uniform turnable middle sections 3 and 3', which here rotates in opposite directions for the benefit of the balance of the mold. If only the upper part of the middle section is considered you see in the lowest phase the empty mold cavity 5 in the middle section 3. In the next phase at the left on the figure this mold cavity 5 serves in connection with he core 4 from the mold part 1 for the molding of the first part 6 of the plastic part. In the upper phase is added the for the insertion meant pan 10 in the half part 6. This can take place while the mold is still closed, which saves time. In the last phase at the right is the last piece of the plastic part 8 molded on, so that the metal part 10 now is firmly encapsulated in the plastic.

In FIG. 6 is shown the same tool in open position where the finished in-molded part 6-10-8 can be ejected after which the process can proceed continuously.

That on the drawing shown is only a couple of examples on how this invention can be transformed into functioning tools.

A long row of other designs of he tool according to the invention can be imagined, but the shown examples should be sufficient to show the fundamental principles of the invention.

In that on the drawing shown two-component edition, where the inner piece of the part is molded before the next, you can achieve that the two pieces of the part after the ejection are not that coherent, so that they are not able to be moved in respect of each other, which is relevant by e.g. a screw cap with its adapted tube neck. There could also have been shown an example where you mold the inner mold part at first and then the outermost on top of it, so the two part pieces are more fixed together.

Besides the shown two-component tool there could also have been shown one or more examples of multi-component tools. In a special edition, which is also not shown on the drawing, there can be jaws in both the stationary and/or in the movable mold part, which can be closed completely or partly around the turnable middle-section. Hereby you can e.g. obtain to have four moldable positions, which in this case could be usable for a four component part. These jaws could also be substituted of or combined with core-pull or the like, which opens up for the possibilities of molding very complex multi-component parts, that hardly would have been possible to mold in a traditional way.

Finally there shall be emphasized an example on a tool according to the invention by molding of an one-component subject, where the turnable middle section can substitute a traditional pair of jaws, as the stationary and the movable mold part serves as jaws by the opening- and closing movement in combination with the turnable middle section. Hereby it becomes possible to eject the parts in the direction of movement of the closing unit at the same time as you are molding the parts.

I claim:

1. A method for the production of a molded piece, the method comprising the steps of:
    providing first and second mold parts having oppositely disposed inner surfaces that mate together to form an outer surface of a mold when said first and second mold parts are in a closed position, said first and second mold parts being movable with respect to each other in a transverse direction between said closed position and an open position;
    providing a turnable middle section rotatable about an axis extending perpendicular to the transverse direction in which the mold parts move, said turnable middle section being disposed between said mold parts;
    configuring an outer surface of the turnable middle section to form an inner surface of the mold when disposed opposite one of the inner surfaces of the mold parts that forms the outer surface of the mold in said closed position;
    forming a first molded piece between said turnable middle section and said one of said mold parts when the mold parts are in a closed position;
    opening said mold parts and rotating said turnable middle section;
    closing said mold parts; and
    inserting a preformed secondary component into said first molded piece.

2. The method according to claim 1 wherein said first molded piece is configured to receive and retain said preformed secondary component.

3. The method according to claim 1 further comprising the steps of rotating said turnable middle section so that said first molded piece and said preformed secondary component face the inner surface of one of said mold parts;
    closing said mold parts; and
    molding a second mold piece onto said first molded piece and said preformed secondary component.

4. A method for the production of a molded piece, the method comprising the steps of:
    providing first and second mold parts having oppositely disposed inner surfaces that mate together to form an outer surface of a mold when said first and second mold parts are in a closed position, said first and second mold parts being movable with respect to each other in a transverse direction between said closed position and an open position;
    providing a turnable middle section rotatable about an axis extending perpendicular to the transverse direction in which the mold parts move, said turnable middle section being disposed between said mold parts;
    configuring an outer surface of the turnable middle section to form an inner surface of the mold when disposed opposite one of the inner surfaces of the mold parts that forms the outer surface of the mold in said closed position; and
    introducing a preformed secondary component onto said outer surface of the turnable middle section.

5. The method according to claim 4 further comprising the steps of rotating said turnable middle section so that said preformed secondary component faces the inner surface of one of said mold parts;
    closing said mold parts; and
    molding a second mold piece onto said preformed secondary component.

* * * * *